United States Patent
Martini et al.

(10) Patent No.: US 9,596,217 B2
(45) Date of Patent: *Mar. 14, 2017

(54) MANAGE ENCRYPTED NETWORK TRAFFIC USING SPOOFED ADDRESSES

(71) Applicant: Phantom Technologies, Inc., San Diego, CA (US)

(72) Inventors: Paul Michael Martini, San Diego, CA (US); Peter Anthony Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/201,607

(22) Filed: Mar. 7, 2014

(65) Prior Publication Data
US 2015/0256516 A1    Sep. 10, 2015

(51) Int. Cl.
*G06F 11/00*    (2006.01)
*H04L 29/06*    (2006.01)
*H04L 29/12*    (2006.01)

(52) U.S. Cl.
CPC ...... *H04L 63/0428* (2013.01); *H04L 61/1511* (2013.01); *H04L 63/0236* (2013.01); *H04L 63/10* (2013.01)

(58) Field of Classification Search
CPC . H04L 63/14; H04L 63/1441; H04L 61/1511; H04L 63/0236; H04L 29/12066;
(Continued)

(56) References Cited

U.S. PATENT DOCUMENTS 7,792,994 B1    9/2010    Hernacki
7,809,953 B2 *    10/2010    Little et al. .......... 713/184
(Continued)

FOREIGN PATENT DOCUMENTS

WO    WO2013/150543    10/2013

OTHER PUBLICATIONS

Herrada, "Capture Passwords on HTTPS (SSL) using DNS Spoofing", Feb. 11, 2013, downloaded from the internet at: http://www.hacking-etic.cat/?feed=rss2&lang=en on Oct. 25, 2013, 3 pages.
(Continued)

*Primary Examiner* — Ali Abyaneh
(74) *Attorney, Agent, or Firm* — Fish & Richardson P.C.

(57) ABSTRACT

Methods and systems for managing encrypted network traffic using spoofed addresses. One example method includes receiving a request to resolve a domain name; determining that the domain name is included in a predetermined set of domain names; associating a spoofed address with the domain name; sending a response to the request to resolve the domain name including the spoofed address; receiving a secure request for a resource, the secure request directed to the spoofed address; identifying a user identity associated with the secure request; determining that the secure request is directed to the domain name based on the association between the spoofed address and the domain name; and selectively decrypting and/or blocking the secure request based at least in part on determining that the secure request is directed to the domain name and based at least in part on the user identity associated with the secure request.

30 Claims, 5 Drawing Sheets

(58) Field of Classification Search
CPC ... H04L 63/08; H04L 45/745; H04L 61/6013; H04L 67/1014; H04L 63/1416; H04L 63/1408; H04L 63/0428; H04L 29/06; H04L 63/123; H04W 12/06; H04W 12/12; G06F 21/55
USPC .......................................................... 726/22
See application file for complete search history.

(56) References Cited

U.S. PATENT DOCUMENTS

| | | |
|---|---|---|
| 2005/0050362 A1 | 3/2005 | Peles |
| 2005/0268100 A1* | 12/2005 | Gasparini et al. ............ 713/170 |
| 2007/0180510 A1 | 8/2007 | Long |
| 2008/0222306 A1* | 9/2008 | Bhakta et al. ................ 709/245 |
| 2009/0216875 A1* | 8/2009 | Shi ................................ 709/224 |
| 2012/0290724 A1* | 11/2012 | Noro et al. ................... 709/225 |
| 2012/0303808 A1 | 11/2012 | Xie |
| 2013/0031356 A1 | 1/2013 | Prince |
| 2013/0283385 A1 | 10/2013 | Martini |

OTHER PUBLICATIONS

Koponen, et al. "Secure Socket Layer (SSL) Man-in-the-middle attack", Apr. 18, 2001, downloaded from the internet at: http://sce.uhcl.edu/yang/teaching/csci5931webSecuritySpr04/secure%20Sockets%20Layer%20(SSL)%20Man-in-the-middle%20Attack.htm on Oct. 25, 2013, 4 pages.

International Search Report and Written Opinion issued in International Application No. PCT/US2014/066688, mailed Feb. 16, 2015, 12 pages.

Heckel: "Use SSLsplit to transparently sniff TLS/SSL connections—including non-HTTP(S) protocols, Philipp's Tech Blog", Aug. 4, 2013, downloaded from the internet at: http://blog.philippheckel.com/2013/08/04/use-sslsplit-to-transparently-sniff-tls-ssl-connections/ on Aug. 3, 2015, 9 pages.

International Search Report and Written Opinion issued in International Application No. PCT/US2015/019290, mailed Jun. 11, 2015, 10 pages.

* cited by examiner

MANAGE ENCRYPTED NETWORK TRAFFIC USING SPOOFED ADDRESSES

BACKGROUND

This specification generally relates to managing encrypted network traffic using spoofed addresses.

In corporate and other networks, devices connected to the network may request resources on the network itself, or on external networks such as the Internet. These resources may include websites, file transfer services, servers, or other network resources. In some cases, this request may be made according to a secure protocol such as Hypertext Transfer Protocol Secure (HTTPS), Secure Socket Layer (SSL), Transport Level Security (TLS), or other protocols. The requested resources may be associated with domain names. A device may query a domain name server using the Domain Name System (DNS) protocol to determine an address corresponding to a given domain name.

SUMMARY

In general, one aspect of the subject matter described in this specification may be embodied in systems, and methods performed by data processing apparatuses that include the actions of receiving a request to resolve a domain name; determining that the domain name is included in a predetermined set of domain names; associating a spoofed address with the domain name; sending a response to the request to resolve the domain name, the response including the spoofed address associated with the domain name; receiving a secure request for a resource, the secure request directed to the spoofed address associated with the domain name; identifying a user identity associated with the secure request; determining that the secure request is directed to the domain name based on the association between the spoofed address and the domain name; and selectively decrypting the secure request based at least in part on determining that the secure request is directed to the domain name and based at least in part on the user identity associated with the secure request.

Another example method includes receiving a request to resolve a domain name; determining that the domain name is included in a predetermined set of domain names; associating a spoofed address with the domain name; sending a response to the request to resolve the domain name, the response including the spoofed address; receiving a secure request for a resource, the secure request directed to the spoofed address; identifying a user identity associated with the secure request; determining that the secure request is directed to the domain name based on the association between the spoofed address and the domain name; and selectively blocking the secure request based at least in part on determining that the secure request is directed to the domain name and based at least in part on the user identity associated with the secure request.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In corporate and other networks, secure connections to resources on the Internet are often identified by either a certificate associated with the connection, such as an SSL certificate, or by the address associated with the connection. For certain Internet resources, such an approach can be problematic. For example, some larger network entities may use a master SSL certificate for all services they operate, such that the domain name assigned to the SSL certificate may be a wildcard domain such as "*.example.com." In such a case, managing access to individual services owned by the network entity may be difficult, as multiple services may share the same wildcard certificate. For example, a network owner desiring to block access to a video streaming site may inadvertently block access to a search engine owned by the same entity, as both sites may share the same certificate. Similarly, some network entities use shared addresses across services, such that blocking an address may have the same effect. When requests are made for network services using a secure protocol such as HTTPS, determining the address requested by the request may not be possible without decrypting the request.

Accordingly, the present disclosure describes techniques for managing secure network traffic using spoofed addresses. One example method includes receiving a DNS request, and providing a spoofed address in response. The spoofed address is associated with the domain name, such that when a request is received on that spoofed address, the request can be associated with the domain name without decrypting the request. A user identity associated with the request may also be identified. By associating the request to the domain name in this manner, the request can be selectively blocked or selectively decrypted and its contents examined to determine how to handle the request. The selective blocking and decrypting of the request may also be based on the identified user identity.

The techniques described herein may provide several advantages. A network owner may be able to block access to only certain services operated by a large network entity, as the techniques here and do not rely on the domain name included in an SSL certificate to determine the destination for request. Secure traffic may also be selectively decrypted, such that sensitive traffic, such as a user's personal email, may remain encrypted, while other non-sensitive encrypted traffic, such as requests for a video streaming site, may be decrypted and examined. Further, selective decryption and blocking policies may be applied to individual users or groups of users, allowing additional flexibility in managing the secure traffic.

Figure 1:
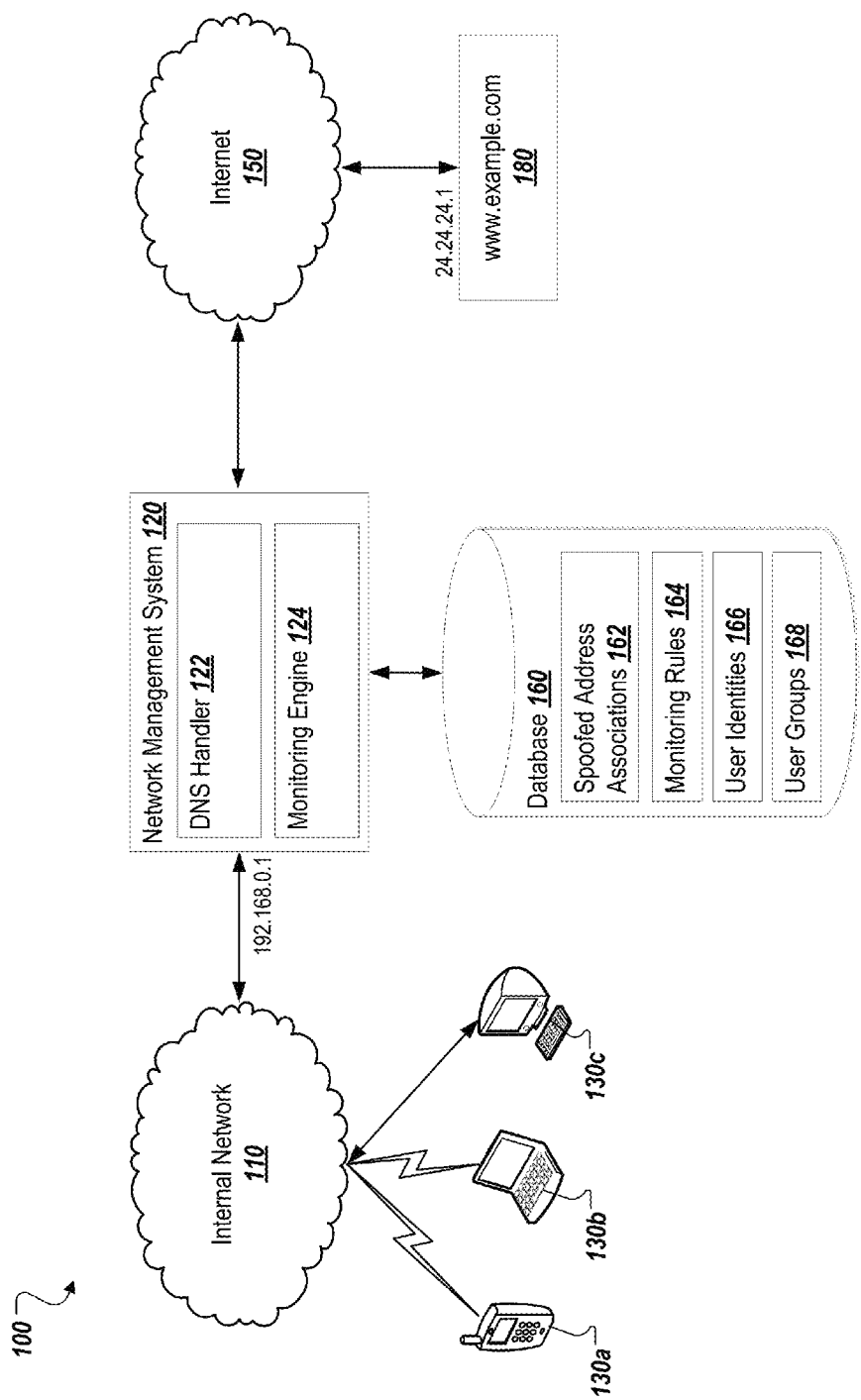
FIG. 1 is a diagram of an example environment.

FIG. 1 is a diagram of an example environment 100. As shown, the example environment includes an internal network 110. A plurality of devices 130a-c are connected to the internal network 110. The example environment 100 also includes a network management system 120. The network management system 120 is connected to a database 160, and the Internet 150. A plurality of websites 180 are connected to the Internet 150.

In operation, the devices 130a-c send DNS queries over the internal network 110 that are received by the network management system 120. The network management system 120 consults the database 160 to determine whether the domain name included in a particular DNS query is to be monitored. If the network management system 120 determines that the domain name is to be monitored, the network management system 120 returns a spoofed address to the requesting device. In some implementations, the spoofed address may be an IP address corresponding to the network management system 120. The spoofed address may also be associated with a server separate from the network management system 120, such as a server connected to the internal network 110, or connected to the Internet 150.

Upon receiving the spoofed address, the requesting device may send a secure request to the spoofed address. In some implementations, the secure request may be a request formatted according to the HTTPS protocol. In implementations where the spoofed address is associated with the network management system 120, the network management system 120 will receive the secure request. Network management system 120 may then determine from the spoofed address a domain name associated with the request. Such a determination is usually not possible without decrypting the secure request, because the requested domain name is included within the encrypted payload. However, by associating the spoofed address with the domain name when processing the DNS query, the network management system 120 may determine that a request to the spoofed address is directed to the domain name without decrypting the secure request.

In some implementations, the network management system 120 may selectively decrypt received secure request based on one or more monitoring rules 164 stored in the database 160. The network management system 120 may examine the contents of the secure request after decrypting in order to determine how to handle the secure request. For example, the network management system 120 may forward or block the received secure request based on the contents of the decrypted request. In some implementations, the network management system 120 may determine whether to forward or block the secure request without decrypting.

The network management system 120 may also identify a user identity associated with the secure request, and may base the determination of whether the block and/or decrypt the secure request based at least in part on the identified user identity. In some cases, the one or more monitoring rules 164 may define different actions to be applied to secure requests associated with different user identities and/or different user groups.

As shown, the environment 100 includes an internal network 110. In some implementations, the internal network 110 may be a wireless network provided by a corporation, educational institution, municipality, business, or other entity. Such a wireless network may utilize any standard wireless networking technology, including 802.11a, 802.11b, 802.11g, 802.11n, LTE, WiMax, CDMA or any other suitable wireless networking technology. In such implementations, the wireless network may be a public network in the sense that any device within range may connect to the network. Even though any device within range may connect to the internal network 110 in such configurations, the device still may be required to authenticate in order to access resources on the internal network 110 and/or on the Internet 150. Such a configuration is often referred to as a Bring Your Own Device (BYOD) network in which users are free to use their own personal devices for connecting to the network. In some implementations, the entity that controls the internal network 110 may issue devices to users for use on the internal network 110. The internal network 110 may also be a wired network, such as an Ethernet network.

The environment 100 also includes one or more devices 130a-c connected to internal network 110. In some implementations, the one or more devices 130a-c include mobile devices, such as cellular telephones (e.g., 130a), smartphones, tablets, laptops (e.g., 130b) and other similar computing devices. The one or more devices 130a-c may also include wired devices such as desktop computer 130c. The one or more devices 130a-c may also include servers. In some implementations, the one or more devices 130a-c include personal devices associated with one or more users. The one or more devices 130a-c may also include devices issued or owned by the entity that provides the internal network 110, such as company-issued smartphones or laptops. In some implementations, the one or more devices 130a-c may include network access or web browsing software (e.g., a web browser) for accessing resources on the Internet 150.

The network management system 120 is connected to the internal network 110. As described above, the network management system 120 is operable to receive DNS requests from the one or more devices 130a-c, selectively return spoofed addresses in response to the DNS queries, and monitor secure requests sent by the one or more devices 130a-c directed to the Internet 150. In some implementations, the network management system may be a server or set of servers connected to the internal network 110. The network management system may be configured as a gateway between the internal network 110 and the Internet 150, such that traffic directed to the Internet 150 passes through the network management system 120. The network management system 120 may also be configured to passively monitor traffic on the internal network 110, such as in a tap or span configuration. In some implementations, the network management system 120 may receive part of the traffic directed to the Internet 150, such that traffic directed to domain names to be monitored passes through the network management system 120, the traffic directed to domain names that are not being monitored does not pass through the network management system 120. In some implementations, the DNS functionality and the monitoring functionality of the network management system 120 may be implemented on separate servers in communication and coordination with one another.

The network management system 120 includes a DNS handler 122. In operation, the DNS handler 122 may receive DNS requests from the one or more devices 130a-c connected to the internal network 110. The DNS handler may consult monitoring rules 164 stored in the database 160 (discussed below) to determine whether to return a spoofed address in response to a particular DNS query. For example, the monitoring rules 164 may specify that all traffic to the domain name "www.example.com" should be monitored. In such a configuration, the DNS handler 122 may respond to a DNS request including the domain name "www.

example.com" with a spoofed address, such as the address "192.168.0.1" shown associated with the network management system 120 in FIG. 1. In some implementations, the spoofed address may be an IP address associated with the network management system 120. The DNS handler 122 may note this association between the domain name from the DNS query and the returned spoofed address in the database 160 as a spoofed address association 162 (described below).

In some implementations, if the DNS handler 122 determines that the domain name in a particular DNS request is not to be monitored, the DNS handler 122 may return an actual address associated with the requested domain name. For example, in response to a request for an address corresponding to "www.example.com" in the situation that that domain name was not being monitored, the DNS handler 122 would return the address corresponding to website 180 (e.g., "24.24.24.1").

The DNS handler 122 may receive DNS entries mapping domain names to addresses from a DNS server or DNS servers connected to the Internet 150. In some implementations, the DNS handler 122 may cache these DNS entries and provide information in the cached entries in response to DNS requests for domain names that are not to be monitored. The DNS handler 122 may also forward DNS requests for domain names that are not to be monitored to DNS servers connected to the Internet 150, and forward the received responses back to the requesting device. In some implementations, the DNS handler 122 may utilize local DNS servers connected to the internal network 110.

The network management system 120 also includes a monitoring engine 124. In operation, the monitoring engine 124 receives secure requests from the one or more devices 130*a-c* that are directed to a spoofed address. The monitoring engine 124 may consult the spoofed address associations 162 in the database 160 (described below) to determine a domain name associated with the secure request received on a spoofed address. Based on the domain name, monitoring engine 124 may determine how to handle the secure request. For example, the monitoring engine 124 may identify a monitoring rule 164 associated with the domain name "www.example.com." The monitoring engine 124 may receive a secure request on "192.168.0.1," the spoofed address associated with the domain name "www.example.com." The monitoring engine 124 may determine that the monitoring rule 164 associated with this domain name indicates the monitoring engine should forward the secure request on to the server associated with the domain name. In response, the monitoring engine 124 may forward the secure request to the website 180 at the appropriate address (e.g., "24.24.24.1"). If the monitoring engine 124 determines that the monitoring rule 164 indicates that the request should be blocked, the monitoring engine 124 may block the request.

In some implementations, the monitoring engine 124 may determine a user identity associated with the received secure request. For example, the monitoring engine 124 may determine the user identity based on association between an address from which the secure request was sent and a particular user identity. Monitoring engine 124 may also determine the user identity based on login information sent prior to or concurrently with the secure request. In some implementations, a user of a particular device may be required to present login information over to authenticate the device on the internal network 110, and the monitoring engine 124 may use this presented login information to determine the user identity associated with particular secure request. In some implementations, determining the particular user identity associated with the secure request may involve querying the database 164 a matching user identity 166.

The monitoring engine 124 may also determine a user group associated with the secure request. In some cases, the monitoring engine 124 may consult the database 160 to determine a particular user group 168 associated with secure request. The monitoring engine 124 may determine the user identity associated with the secure request, and then determine if that particular user identity is associated with a user group.

In some implementations, the user identities 156 and user groups 168 may be associated with one or more of the monitoring rules 164. For example, a particular monitoring rule 164 may apply only to secure requests associated with a particular user identity 166 and/or a particular user group 168, such that the actions associated with particular monitoring rule 164 may be applied to secure requests associated with the particular user identity 166 and/or the particular user group 168.

In some implementations, the monitoring engine 124 may selectively decrypt secure requests received on a spoofed address based on the monitoring rules 164 (and therefore based on the identified user identity, as described above). Based on the contents of the decrypted secure request, the monitoring engine 124 may forward, block, or otherwise handle the secure request. For example, the monitoring engine 124 may examine the headers of the decrypted secure request, and determine that the request has a referrer header prohibited by the associated monitoring rule 164. In response, the monitoring engine 124 may block the secure request. In some implementations, the monitoring engine 124 may modify the decrypted secure request based on the monitoring rules 164. For example, the monitoring engine 124 may replace the referrer header in the secure request with a different referrer header. The monitoring engine 124 may then re-encrypt the decrypted secure request, and forward it to the appropriate destination.

Although the DNS handler 122 and the monitoring engine 124 are shown as separate components, in some implementations the two components may be combined. In some cases, the two components may be separate modules within a single software process. The DNS handler 122 and monitoring engine 124 may also be located on separate servers connected to the internal network 110. The monitoring engine 124 may be in communication with one or more monitoring servers to which spoofed addresses are pointed. The monitoring servers may communicate with the monitoring engine 124 in order to determine how to handle secure requests received.

The database 160 is connected to the network management system 120. In some implementations, the database 160 may be stored on the same server as the network management system 120. The database 160 may also be stored on a separate server and accessed by the network management system 120 over a network. The database 160 may be any proprietary or commercially available database system or format, including, but not limited to, MySQL®, Microsoft® SQLServer, IBM® DB2, Oracle®, SQLite, or any other suitable database system or format. The database 160 may also be a distributed database running on a plurality of servers. In some implementations, the database 160 may be a configuration file or set of configuration files associated with the network management system 120.

The database 160 includes spoofed address associations 162. In some implementations, the spoofed address associations 162 arose within a database table mapping domain names to spoofed addresses. In some implementations, the spoofed addresses are unique such that only one spoofed address may be associated to anyone domain name. In some implementations, the spoofed addresses may be an IP address and port combination. The spoofed addresses may also be selected from a pool of spoofed addresses. For example, a network administrator may specify that all addresses on the subnet "192.168.*.*" are spoofed addresses, and that the network management system 120 should select an address from this pool when need to spoofed address. In some implementations, specific addresses may be specified as spoofed addresses, and the designations of spoofed addresses may be stored within the database 160.

Database 160 also includes monitoring rules 164. In some implementations, the monitoring rules 164 may specify actions to be performed for traffic directed to a particular domain name. For example, a monitoring rule 164 may specify that traffic for the domain name "www.example.com" should be directed to a particular spoofed address pool, that all the traffic directed to the domain name should be decrypted, and traffic including a referrer header of "www.badguy.com" should be blocked.

The database 160 includes user identities 166. In some implementations, the user identities 166 correspond to user identifiers, such as, for example, user names, authentication tokens, security certificates, encryption keys, or other identifiers. The user identities 166 may also correspond to login credentials associated with particular users. In some implementations, the user identities 166 may include associated information that may be used to identify a particular user identity for the received secure request. For example, the user identities 166 may include an IP address or other network identifier associated with a device currently in use by the user represented by the particular user identity 166. User identities 166 may also include other types of identifiers to use when determining a particular user identity for receipt secure request, such as, for example, session IDs, globally unique identifiers (GUIDs), socket identifiers, file descriptors, Media Access Control (MAC) addresses, or other identifiers. In some implementations, the user identities 166 may be created and maintained by the network management system 120 based on observed network activity. For example, the network management system 120 may create the user identity 166 including a particular IP address upon observing a particular user authenticating to the internal network 110 from the particular IP address. In some cases, the user identities 166 may be created and maintained by an external system, such as a network authentication system (not shown).

The database 160 also includes user groups 168. In some implementations, the user groups 168 include one or more of user identities 166. The user groups 168 may also be defined in a wild-card fashion, such that individual user identities 166 need not be associated with particular user groups 168. For example, the particular user group 168 may define that any message sent secure request sent from a particular range of network addresses (e.g., "192.168.1.*") Is associated with the particular user group 168. In this way, monitoring rules 164 associated with a particular user group 168 may be applied to all secure requests sent from the range of network addresses.

Figure 2:
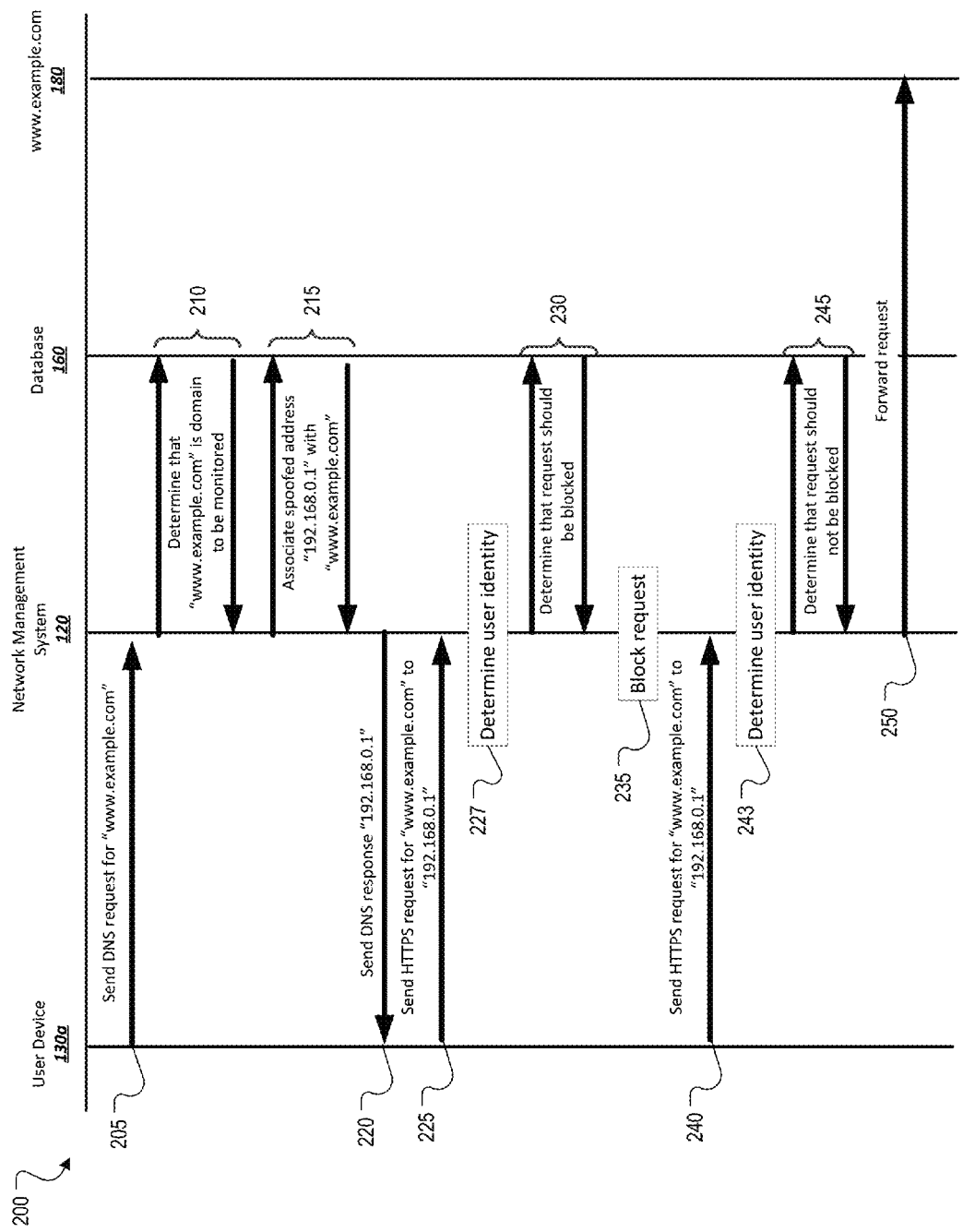
FIG. 2 is a message flow diagram of an example interaction between the components of the example environment to manage encrypted network traffic using spoofed addresses.

FIG. 2 is a message flow diagram of an example interaction 200 between the components of the example environment 100 to manage encrypted network traffic using spoofed addresses. At 205, the user device 130 a sends the DNS request for "www.example.com" to the network management system 120. At 210, the network management system 120 consults the database 160 to determine that the domain name "www.example.com" is a domain name to be monitored. In some implementations, the network management system 120 queries the database 160 for a monitoring rule associated with the domain name "www.example.com."

Upon determining that the domain name "www.sample.com" should be monitored, the network management system 120 interacts with the database to associate the spoofed address "192.168.0.1" with the domain name "www.sample.com" (at 215). In some implementations, the network management system 120 inserts a new row into a table storing the spoofed address associations 162 (shown in FIG. 1). In some implementations, associating the spoofed address may include selecting a free address from a pool of spoofed addresses in the database 160. Associating the spoofed address may also include selecting a specific address configured for the requested domain name from the database 160.

At 220, the network management system 120 sends a DNS response including the spoofed address "192.168.0.1." At 225, the device 130a sends an HTTPS request for "www.example.com" to the spoofed address "192.168.0.1." In some implementations, the request may be sent using a secure protocol other than HTTPS.

At 227, the network management system 120 determines the user identity associated with the secure request sent at 225. As discussed previously, the network management system 120 may make this determination based on previously received login information from the user device 130a, based on an association between a particular user identity and an attribute of the secure request (e.g., a source IP address), or based on other factors. In some implementations, determining the user identity also includes determining a user group associated with the secure request, as described above.

At 230, the network management system 120 consults the database to determine that the request should be blocked. In some implementations, the network management system 120 may create a database 160 for a monitoring rule 164 associated with the domain and. The network management system 120 may then consult the monitoring rule 164 to determine that the request should be blocked. As described previously, the network management system 120 may base this determination at least in part on the user identity determined at 227. In some implementations, as described previously, the network management system 120 may decrypt the received request in order to determine that the request should be blocked. Network management system 120 may examine the decrypted request and determine whether to block the request based on the contents of the request. At 235, the network management system 120 blocks the request. In some implementations, blocking the request may include dropping the request. Blocking the request may also include returning a response to the user device 130a indicating that the request is been blocked.

At 240, the user device 130a sends an HTTPS request for "www.example.com" to "192.168.0.1." At 242, the network management system 120 determines the user identity associated with the secure request sent at 240. As discussed previously, the network management system 120 may make this determination based on previously received login information from the user device 130a, based on an association between a particular user identity and an attribute of the secure request (e.g., a source IP address), or based on other factors. In some implementations, determining the user identity also includes determining a user group associated with the secure request, as described above.

At 245, the network management system 120 consults the database 160 to determine that the request should not be blocked. As described previously, the network management system 120 may base this determination at least in part on the user identity determined at 242. In some implementations, as discussed previously, the network management system 120 may decrypt the request and examine its contents to determine whether the request should be blocked. Upon determining that the request should not be blocked, at 250, the network management system 120 forwards the request to the website 180 corresponding to the domain name "www.example.com."

Figure 3:
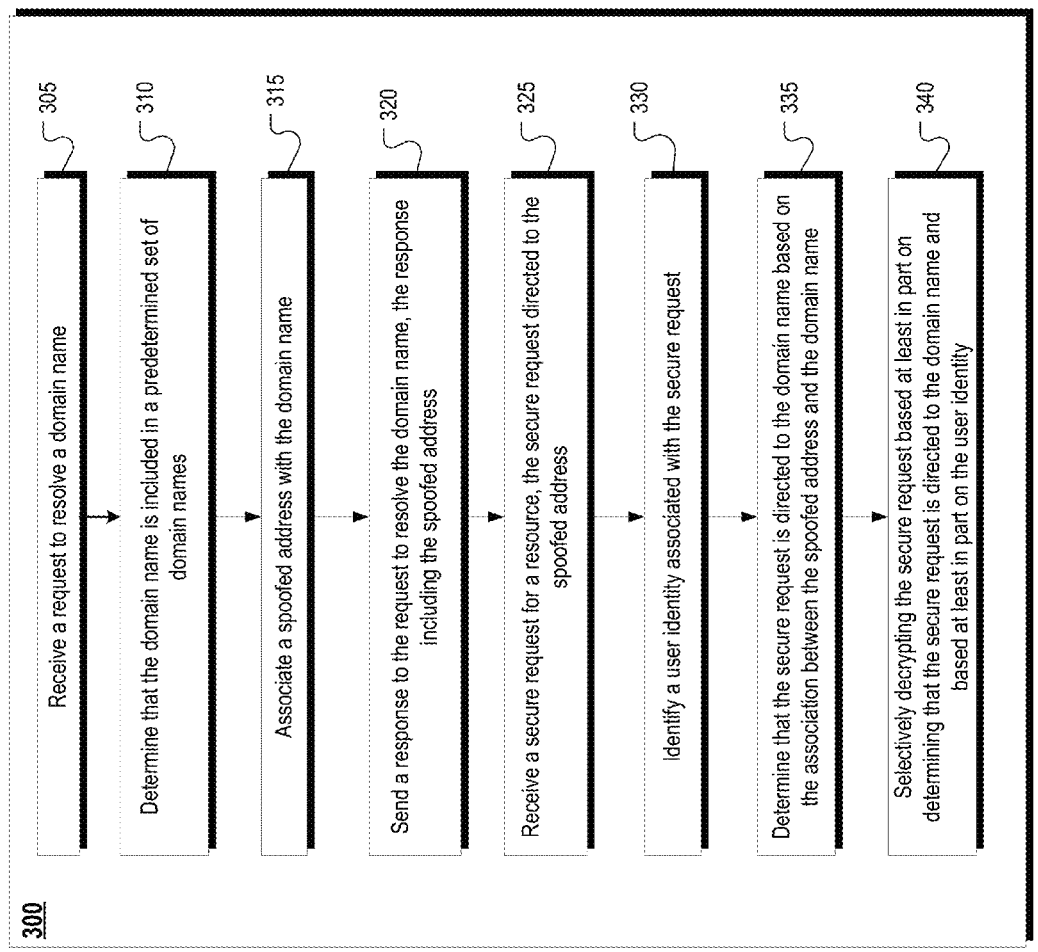
FIG. 3 is a flow chart of an example process of managing encrypted network traffic using spoofed addresses.

FIG. 3 is a flow chart of an example process 300 of managing encrypted network traffic using spoofed addresses. At 305, a request is received to resolve the domain name. In some implementations, the request may be received according to the DNS protocol. At 310, a determination is made that the domain name is included in a predetermined set of domain names. In some implementations, the determination may be made by consulting a database (e.g., 160).

At 315, a spoofed address associated with the domain name. In some implementations, the spoofed address as a local address on the same network as a device that sent the request to resolve the domain name. Spoofed address may also be an address on the public network, such as the Internet. In some cases, the spoofed address may be an IP address, an IP address and port combination, or another type of address.

At 320, a response to the request to resolve the domain name is sent, the response including the spoofed address. In some implementations, the response is sent according to the DNS protocol. At 325, a secure request for resource is received, the secure request directed to the spoofed address.

At 330, a user identity associated with the secure request is identified. In some cases, the user identity is associated with the secure request upon receiving the secure request. The user identity may also be associated with a network address before receiving the secure request. In such a case, a determination is then made that the secure request was sent from the network address upon receiving the secure request, and the user identity may then be associated with the network address to the secure request. In some cases, receiving the secure request includes receiving the user identity.

At 335, a determination is made that the secure request is directed to the domain name based on the association between the spoofed address and the domain. At 340, the secure request is selectively decrypted based at least in part on determining that the secure request is directed to the domain name and based at least in part on the user identity. In some implementations, selectively decrypting the secure requests includes determining that the secure request should be decrypted based at least in part on one or more rules, and decrypting secure request to generate decrypted information. The decrypted information may be inspected in order to determine whether to forward, block, and/or modify the secure request.

In some implementations, receiving the secure request may include establishing a first secure connection with a sender of the secure request, and establishing a second secure connection with an address associated with the resource after establishing the first secure connection with the sender. Such an approach is generally known as a "client first" procedure.

In some implementations, receiving the secure request may include establishing a first secure connection with an address associated with the resource, and establishing a second secure connection with a sender of the secure request after establishing the first secure connection with the address associated with the resource. Such an approach is generally known as a "server first" procedure.

In some cases, a request to resolve a second domain name different than the first domain name is received. A determination is made with the second domain name is not included in the predetermined set of domain names, and a response to the request to resolve the second domain name is set including an address corresponding to the second domain. In some implementations, if the domain name is not included in the predetermined set of domain names, the request to resolve the domain name may be forwarded on to a DNS server, and the response from the DNS server may be forwarded back to the requester.

In some implementations, a second request to resolve the domain name is received. A determination is made that the domain name is associated with the spoofed address, and a response is sent to the second request including the spoofed address, such that a new spoofed address is not associated with the domain name.

Figure 4:
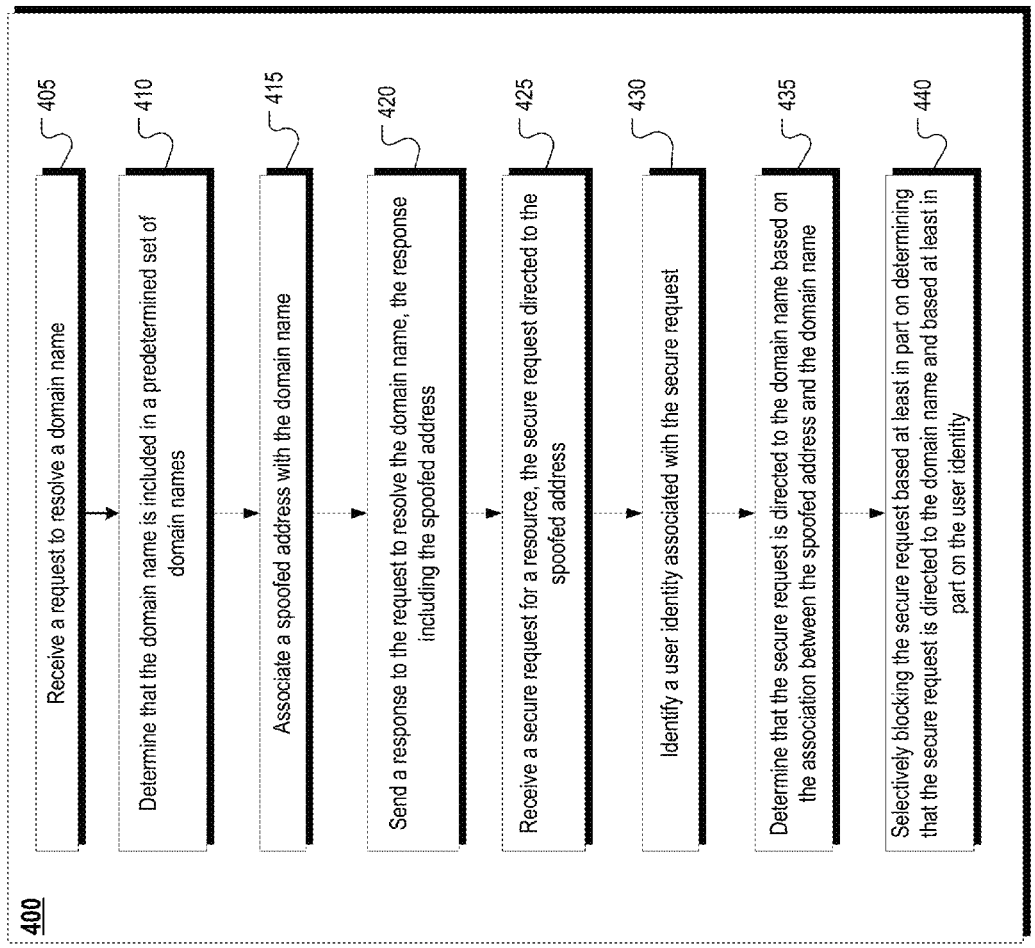
FIG. 4 is a flow chart of an example process of managing encrypted network traffic using spoofed addresses.

FIG. 4 is a flow chart of an example process 400 of managing encrypted network traffic using spoofed addresses. At 405, a request is received to resolve the domain name. In some implementations, the request may be received according to the DNS protocol. At 410, a determination is made that the domain name is included in a predetermined set of domain names. In some implementations, the determination may be made by consulting a database (e.g., 160).

At 415, a spoofed address associated with the domain name. In some implementations, the spoofed address as a local address on the same network as a device that sent the request to resolve the domain name. Spoofed address may also be an address on the public network, such as the Internet. In some cases, the spoofed address may be an IP address, an IP address and port combination, or another type of address.

At 420, a response to the request to resolve the domain name is sent, the response including the spoofed address. In some implementations, the response is sent according to the DNS protocol. At 425, a secure request for resource is received, the secure request directed to the spoofed address.

At 430, a user identity associated with the secure request is identified. In some cases, the user identity is associated with the secure request upon receiving the secure request. The user identity may also be associated with a network address before receiving the secure request. In such a case, a determination is then made that the secure request was sent from the network address upon receiving the secure request, and the user identity may then be associated with the network address to the secure request. In some cases, receiving the secure request includes receiving the user identity.

At 435, a determination is made that the secure request is directed to the domain name based on the association between the spoofed address and the domain. At 440, the secure request is selectively decrypted based at least in part on determining that the secure request is directed to the domain name and based at least in part on the user identity. In some implementations, selectively decrypting the secure requests includes determining that the secure request should be decrypted based at least in part on one or more rules, and decrypting secure request to generate decrypted information.

The decrypted information may be inspected in order to determine whether to forward, block, and/or modify the secure request.

In some implementations, receiving the secure request may include establishing a first secure connection with a sender of the secure request, and establishing a second secure connection with an address associated with the resource after establishing the first secure connection with the sender. Such an approach is generally known as a "client first" procedure.

Figure 5:
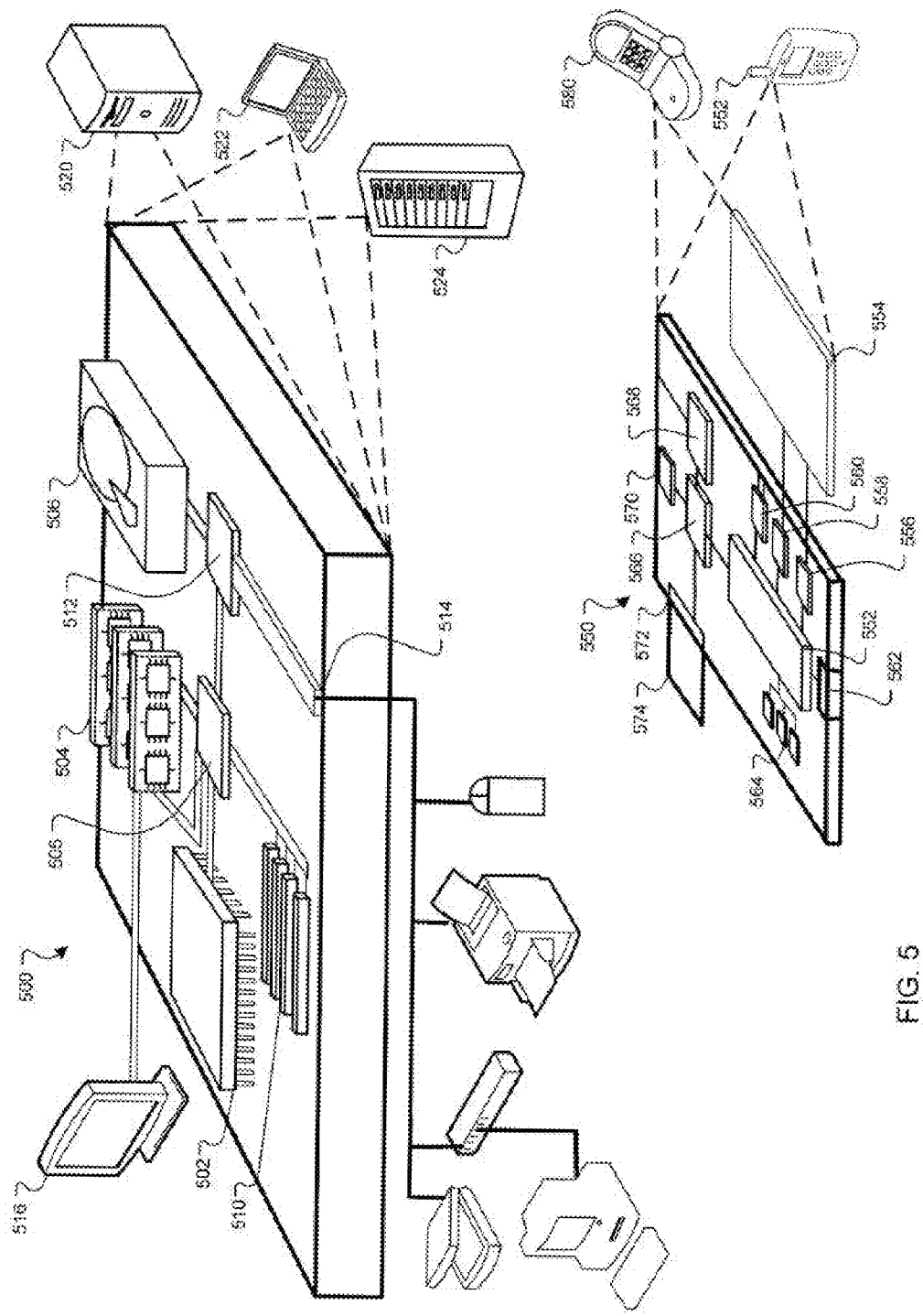
FIG. 5 is a diagram of computing devices that may be used to implement the systems and methods described in this document.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 510 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method executed by one or more processors, the method comprising:
   receiving a request to resolve a particular domain name;
   in response to receiving the request to resolve a particular domain name, determining that secure requests directed to the particular domain name cannot be distinguished from secure requests directed to at least one other domain name based on a target address associated with each secure request;
   in response to receiving the request to resolve a particular domain name and to determining that the secure requests directed to the particular domain name cannot be distinguished from the secure requests directed to the at least one other domain name, uniquely associating a particular spoofed address with the particular domain name, wherein the particular spoofed address uniquely identifies the particular domain name after it is associated, and wherein the particular spoofed address identifies a different network location than a real address corresponding to the particular domain name;
   sending a response to the request to resolve the particular domain name, the response including the particular spoofed address associated with the particular domain name;
   receiving a secure request directed to the particular spoofed address associated with the particular domain name;
   identifying a user identity associated with the secure request based on the secure request without decrypting the secure request;
   determining that the secure request is directed to the particular domain name based on the unique association between the particular spoofed address and the particular domain name without decrypting the secure request; and
   selectively decrypting the secure request based at least in part on determining that the secure request is directed to the particular domain name and based at least in part on the user identity associated with the secure request.

2. The method of claim 1, wherein the particular spoofed address includes an internet protocol (IP) address, receiving the request to resolve the particular domain name includes receiving a Domain Name System (DNS) request, and sending the response to the request to resolve the particular domain name includes sending a DNS response.

3. The method of claim 1, wherein selectively decrypting the secure request comprises:
   determining that the secure request should be decrypted based at least in part on one or more rules; and
   decrypting the secure request to generate decrypted information.

4. The method of claim 3, further comprising:
   inspecting the decrypted information;
   determining that the secure request should be forwarded based at least in part on inspecting the decrypted information and at least in part on the one or more rules; and
   forwarding the secure request to an address associated with the particular domain name, the address being different than the particular spoofed address.

5. The method of claim 4, wherein forwarding the secure request comprises:
   re-encrypting the secure request; and
   sending the secure request to the address associated with the particular domain name.

6. The method of claim 3, further comprising:
   inspecting the decrypted information;
   determining that the secure request should be forwarded based at least in part on inspecting the decrypted information and at least in part on the one or more rules;
   modifying the decrypted information based at least in part on the one or more rules;
   encrypting the decrypted information to produce a second secure request; and
   forwarding the second secure request to an address associated with the particular domain name, the address being different than the particular spoofed address.

7. The method of claim 3, further comprising:
   inspecting the decrypted information;
   determining that the secure request should be blocked based at least in part on inspecting the decrypted information and at least in part on the one or more rules; and
   blocking the secure request.

8. The method of claim 7, wherein blocking the secure request includes sending a redirect response to the secure request, the redirect response including an address associated with a block notification page.

9. The method of claim 1, wherein receiving the secure request comprises:
   establishing a first secure connection with a sender of the secure request; and
   establishing a second secure connection with an address associated with a resource identified by the secure request after establishing the first secure connection with the sender.

10. The method of claim 1, wherein receiving the secure request comprises:
    establishing a first secure connection with an address associated with a resource identified by the secure request; and
    establishing a second secure connection with a sender of the secure request after establishing the first secure connection with the address associated with the resource.

11. The method of claim 1, wherein selectively decrypting the secure request comprises:
    determining that the secure request should not be decrypted based at least in part on one or more rules; and
    forwarding the secure request to an address associated with the particular domain name, the address being different than the particular spoofed address.

12. The method of claim 1, wherein the particular domain name is a first domain name, the method further comprising:
    receiving a request to resolve a second domain name different than the first domain name;
    determining that secure requests directed to the second domain name can be distinguished from secure requests directed to other domain names based on a target address associated with each secure request; and
    sending a response to the request to resolve the second domain name, the response including a real address corresponding to the second domain name.

13. The method of claim 1, further comprising:
    receiving a second request to resolve the particular domain name;
    determining that the particular domain name is associated with the particular spoofed address; and sending a response to the second request to resolve the particular domain name, the response including the particular spoofed address.

14. The method of claim 1, wherein the particular spoofed address includes an internet protocol (IP) address and an IP port.

15. The method of claim 1, wherein receiving the secure request includes receiving a request according to Hypertext Transfer Protocol Secure (HTTPS).

16. The method of claim 1, further comprising associating the user identity with the secure request upon receiving the secure request.

17. The method of claim 16, further comprising:
associating the user identity with a network address before receiving the secure request;
determining that the secure request was sent from the network address upon receiving the secure request; and
associating the user identity associated with the network address to the secure request.

18. The method of claim 1, wherein receiving the secure request includes receiving the user identity.

19. A computer-implemented method executed by one or more processors, the method comprising:
receiving a request to resolve a particular domain name;
in response to receiving the request to resolve a particular domain name, determining that secure requests directed to the particular domain name cannot be distinguished from secure requests directed to at least one other domain name based on a target address associated with each secure request;
in response to receiving the request to resolve a particular domain name and to determining that the secure requests directed to the particular domain name cannot be distinguished from the secure requests directed to the at least one other domain name, uniquely associating a particular spoofed address with the particular domain name, wherein the particular spoofed address uniquely identifies the particular domain name after it is associated, and wherein the particular spoofed address identifies a different network location than a real address corresponding to the particular domain name;
sending a response to the request to resolve the particular domain name, the response including the particular spoofed address associated with the particular domain name;
receiving a secure request directed to the particular spoofed address associated with the particular domain name;
identifying a user identity associated with the secure request based on the secure request without decrypting the secure request;
determining that the secure request is directed to the particular domain name based on the unique association between the particular spoofed address and the particular domain name without decrypting the secure request; and
selectively blocking the secure request based at least in part on determining that the secure request is directed to the particular domain name and based at least in part on the user identity associated with the secure request.

20. The method of claim 19, wherein the particular spoofed address includes an internet protocol (IP) address, receiving the request to resolve the particular domain name includes receiving a Domain Name System (DNS) request, and sending the response to the request to resolve the particular domain name includes sending a DNS response.

21. The method of claim 19, wherein the particular domain name is a first domain name, the method further comprising:
receiving a request to resolve a second domain name different than the first domain name;
determining that secure requests directed to the second domain name can be distinguished from secure requests directed to other domain names based on a target address associated with each secure request; and
sending a response to the request to resolve the second domain name, the response including a real address associated with the second domain name.

22. The method of claim 19, further comprising:
receiving a second request to resolve the particular domain name;
determining that the particular domain name is associated with the particular spoofed address; and
sending a response to the second request to resolve the particular domain name, the response including the particular spoofed address.

23. The method of claim 19, wherein selectively blocking the secure request includes:
determining that the secure request should be blocked based at least in part on a rule associated with the particular domain name; and
blocking the secure request.

24. The method of claim 19, wherein selectively blocking the secure request includes:
determining that the secure request should not be blocked based at least in part on a rule associated with the particular domain name; and
forwarding the secure request to an address associated with the particular domain name and different than the particular spoofed address.

25. The method of claim 19, wherein receiving the secure request includes receiving a request according to Hypertext Transfer Protocol Secure (HTTPS).

26. The method of claim 19, further comprising associating the user identity with the secure request upon receiving the secure request.

27. The method of claim 26, further comprising:
associating the user identity with a network address before receiving the secure request;
determining that the secure request was sent from the network address upon receiving the secure request; and
associating the user identity associated with the network address to the secure request.

28. The method of claim 19, wherein receiving the secure request includes receiving the user identity.

29. A system comprising:
memory for storing data; and
one or more processors operable to perform operations comprising:
receiving a request to resolve a particular domain name;
in response to receiving the request to resolve a particular domain name, determining that secure requests directed to the particular domain name cannot be distinguished from secure requests directed to at least one other domain name based on a target address associated with each secure request;
in response to receiving the request to resolve a particular domain name and to determining that the secure requests directed to the particular domain name cannot be distinguished from the secure requests directed to the at least one other domain name, uniquely associating a particular spoofed address with the particular domain name, wherein the particular spoofed address uniquely identifies the particular domain name after it is associated, and wherein the particular spoofed address identifies a different network location than a real address corresponding to the particular domain name;

sending a response to the request to resolve the particular domain name, the response including the particular spoofed address associated with the particular domain name;

receiving a secure request directed to the particular spoofed address associated with the particular domain name;

identifying a user identity associated with the secure request based on the secure request without decrypting the secure request;

determining that the secure request is directed to the particular domain name based on the unique association between the particular spoofed address and the particular domain name without decrypting the secure request; and selectively decrypting the secure request based at least in part on determining that the secure request is directed to the particular domain name and based at least in part on the user identity associated with the secure request.

30. A system comprising:

memory for storing data; and one or more processors operable to perform operations comprising:

receiving a request to resolve a particular domain name;

in response to receiving the request to resolve a particular domain name, determining that secure requests directed to the particular domain name cannot be distinguished from secure requests directed to at least one other domain name based on a target address associated with each secure request;

in response to receiving the request to resolve a particular domain name and to determining that the secure requests directed to the particular domain name cannot be distinguished from the secure requests directed to the at least one other domain name, uniquely associating a particular spoofed address with the particular domain name, wherein the particular spoofed address uniquely identifies the particular domain name after it is associated, and wherein the particular spoofed address identifies a different network location than a real address corresponding to the particular domain name;

sending a response to the request to resolve the particular domain name, the response including the particular spoofed address associated with the particular domain name;

receiving a secure request directed to the particular spoofed address associated with the particular domain name;

identifying a user identity associated with the secure request based on the secure request without decrypting the secure request;

determining that the secure request is directed to the particular domain name based on the unique association between the particular spoofed address and the particular domain name without decrypting the secure request; and selectively blocking the secure request based at least in part on determining that the secure request is directed to the particular domain name and based at least in part on the user identity associated with the secure request.

* * * * *